March 22, 1955  J. G. MACAULAY  2,704,426
FASTENING DEVICE
Filed Nov. 15, 1954
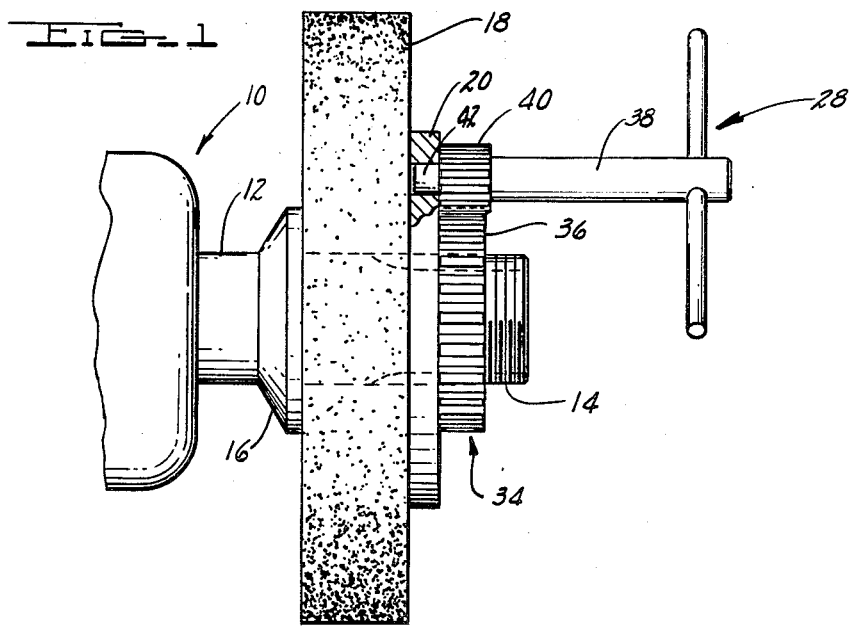
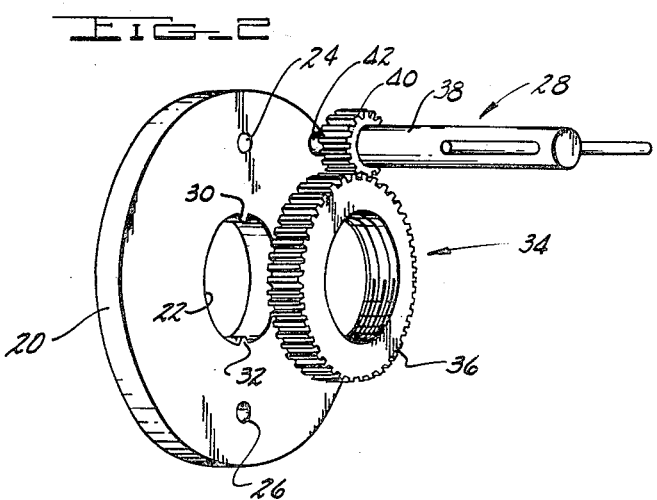
INVENTOR.
JOHN G. MACAULAY
BY
SMITH, OLSEN & KOTTS
ATTORNEYS

2,704,426

FASTENING DEVICE

John G. Macaulay, Redford, Mich.

Application November 15, 1954, Serial No. 468,823

4 Claims. (Cl. 51—168)

The present invention relates to a mechanism for securing a threaded fastening member on a threaded shaft, which mechanism is particularly adapted for use with a machine such as a grinder.

Conventional fasteners such as threaded nuts are difficult to handle in situations such as when a grinding wheel is affixed to a grinder shaft. For example, it is often necessary to hold the grinding wheel with one hand while the usual end wrench or box wrench is held in the other hand in engagement with the nut. The application of a substanital force on the wrench in this type of operation places a substantial strain on the grinding wheel and sometimes causes breakage.

It is a primary object of the present invention to provide a mechanism for securing a threaded fastening member on a threaded shaft which is easy and economical to manufacture, and which is simple to use efficiently.

It is another object of the present invention to provide a mechanism for securing a threaded fastening member on the shaft of a device such as a grinder which is easy to operate and efficient in use.

Other objects of this invention will appear in the following description and appended claims, reference being had to the accompanying drawings forming a part of this specification wherein like reference characters designate corresponding parts in the several views.

In the drawings:

Figure 1 is a fragmentary elevation of a grinding wheel showing the fastening mechanism of the present invention in use, a portion being broken away for clarity.

Figure 2 is a perspective view of the separate componets of the fastening mechanism of the present invention.

Referring to the drawings, the number 10 designates generally a grinding machine which includes a rotatable spindle 12 having a threaded end portion 14 and a shoulder flange 16. It has been conventional practice in the past to affix the grinding wheel 18 against the shoulder flange 16 by drawing a polygonal nut against the grinding wheel 18 on the threaded end 14 of spindle 12.

It will be noted that this has been replaced in the present invention with a bearing washer 20 which has a central opening 22 slightly larger than the diameter of the spindle 12. This bearing washer includes the bearing holes 24 and 26 which are adapted to seat the locking key 28. The bearing washer 20 may also be provided with inwardly extending lugs 30 and 32 which mate with corresponding slots in the spindle 12.

After the bearing washer 20 is slid into position adjacent the grinding wheel 18, a fastener 34 is screwed onto the threaded end portion 14 of spindle 12. This fastener has a toothed portion 36 formed on its periphery.

The key 28 is then used. This key includes a handle portion 38, a toothed locking portion 40, and a locating portion 42. The toothed locking portion 40 of the key 28 is engaged with the toothed periphery 36 of the fastener 34 as the locating portion 42 is slipped into bearing hole 24 or 26 (see Fig. 1). The handle 38 of the key 28 is then rotated to turn the toothed portion 40. The turning toothed portion 40 rotates the fastener 34 through the toothed periphery 36, and the fastener 34 is tightened against the bearing washer 20 to hold the grinding wheel 18 against the shoulder flange 16. As the key 28 is rotated, the locating portion 42 rotates in the bearing hole on washer 20, and the washer is prevented from rotating by its frictional contact with the grinding wheel 18 or by the lugs 30 and 32. Of course, loosening of the fastener 34 is accomplished by rotating the key 28 in the opposite direction.

In usage, this fastening mechanism has proven to be more rapid and easy to handle than other types of fastening devices hertofore used.

From the foregoing description, it will be seen that I have provided a simple and efficient mechanism for securing a threaded fastener to a threaded shaft.

Having thus described my invention, I claim:

1. A mechanism for securing a threaded fastening member on a threaded shaft, comprising a gear portion on said fastening member, a bearing member for placement in sliding engagement on said shaft adjacent said fastening member, a force-applying member adapted to be engaged with said bearing member, and teeth formed on said force-applying member for engaging the gear portion of said fastening member, the fastening member being adjusted on the shaft by movement of said force-applying member and resultant movement of said fastening member.

2. A mechanism for securing a threaded fastening member on a threaded shaft, comprising a gear portion on said fastening member, a bearing washer for placement in sliding engagement on said shaft adjacent said fastening member and having a locating hole therein, a force-applying member adapted to have its end inserted into the locating hole in said bearing washer, and teeth formed on said force-applying member for engaging the gear portion of said fastening member, the fastening member being adjusted on the shaft by movement of said force-applying member and resultant movement of said fastening member.

3. A device for securing a threaded fastener on a grinder shaft having a grinding wheel thereon, comprising a bearing washer adapted to be placed in sliding engagement over said grinding shaft adjacent the grinding wheel, said bearing washer having a hole therein, a threaded nut having a toothed periphery adapted to be placed on said shaft adjacent said bearing washer, and a force-applying member having a gear portion thereon, said force-applying member having its end inserted into the hole in said bearing washer and its gear portion engaged with the toothed periphery of the nut so that rotation of the force-applying member will lock said nut against the bearing washer and the bearing washer against the grinding wheel.

4. In combination, a grinding wheel disposed on a grinding shaft, said shaft having a keyway therein, a bearing washer disposed over said shaft and having a locating hole therein, said bearing washer also having an inwardly extending key disposed in the keyway in said shaft, a threaded lock nut having a toothed periphery disposed on said shaft adjacent said washer, said lock nut being adjusted by a key having a geared portion which engages the toothed periphery on the lock nut and a locating end portion which seats in the locating hole in the bearing washer.

References Cited in the file of this patent

UNITED STATES PATENTS 2,541,772    Lockard _____ Feb. 13, 1951